Oct. 2, 1956  J. B. DYER  2,765,064
STOP AND POSITION MEANS FOR WINDSHIELD WIPER
Filed April 6, 1953  2 Sheets-Sheet 1

INVENTOR.
JOHN B. DYER
BY George H. Strickland
HIS ATTORNEY

Oct. 2, 1956  J. B. DYER  2,765,064
STOP AND POSITION MEANS FOR WINDSHIELD WIPER
Filed April 6, 1953  2 Sheets-Sheet 2
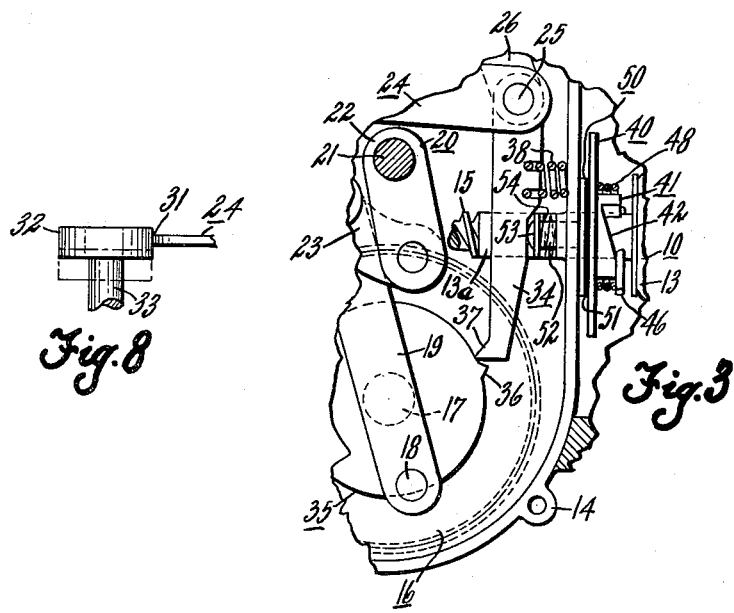
Fig. 8
Fig. 3
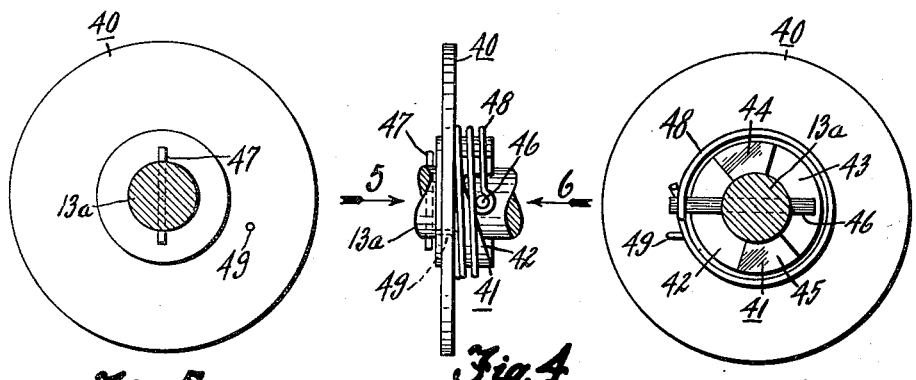
Fig. 5  Fig. 4  Fig. 6
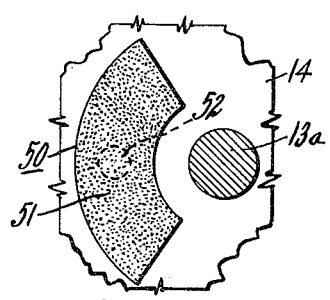
Fig. 7
INVENTOR.
JOHN B. DYER
BY George H. Strickland
HIS ATTORNEY though it may occur elsewhere, and the device may be used to arrest rotation of a driven element other than a windshield wiper motor. It will, therefore, be seen that modifications may be made without departing from the spirit of the invention.

United States Patent Office 2,765,064
Patented Oct. 2, 1956

2,765,064
STOP AND POSITION MEANS FOR WINDSHIELD WIPER

John B. Dyer, Syracuse, N. Y., assignor to General Motors Corporation, Detroit, Mich., a corporation of Delaware Application April 6, 1953, Serial No. 347,023

16 Claims. (Cl. 192—116.5)

The present invention pertains to motor control means, and more particularly to means for arresting rotation of motor driven element.

Precise control of an electric motor, as relating to arresting rotation thereof, is often times a necessity. This necessity arises from the fact that an element driven by an electric motor must come to rest at a predetermined position, one example being a windshield wiper blade which preferably should come to rest at a predetermined parked position. This invention relates to novel means for decelerating an electric motor shaft substantially instantaneously whereby a motor shaft revolving at a high angular velocity may be brought to a standstill in a very short time. Accordingly, among my objects are the provision of means for decelerating a rotating element; the further provision of self-energizing brake means for arresting rotation of an element; and the still further provision of automatic means for initiating self-energization of the aforementioned brake means.

The aforementioned and other objects are accomplished in the present invention by employing a self-energizing friction brake assembly for arresting rotation of an armature shaft. Specifically the brake assembly includes a first brake element encompassing a rotatable shaft and adapted for limited rotation in one direction relative thereto. The first brake element is also adapted for limited axial movement relative to the shaft. A second brake element, having a friction surface thereon adapted for engagement with the first brake element, is positively restrained against rotation, but is adapted for limited axial movement relative to the shaft and the first brake element.

In the disclosed embodiment the shaft is rotated by a unidirectional electric motor, the shaft having formed thereon a worm for actuating motion converting mechanism suitable for operating a pair of windshield wiper blades in unison, it being understood that the foregoing is only exemplary. The motion converting mechanism, or mechanical movement, includes a worm gear operatively connected to and driven by the worm. The worm gear constitutes the rotatable driving member of the motion converting mechanism which is adapted to impart oscillatory movement to a driven member, in this instance a shaft having a lever, or arm, extending therefrom. The driving and driven members are interconnected by a compound linkage comprising a connecting rod and an operating link. The connecting rod has one end pivotally connected by means of a crank pin to the worm gear, and the operating link has one end pivotally connected to the arm of the driven member. The opposite ends of the connecting rod and operating link are pivotally interconnected.

The aforegoing mechanical movement imparts oscillation of predetermined fixed magnitude to the driven member upon rotation of the driving member. Inasmuch as the mechanism may be employed to actuate windshield wiper blades, means are provided for increasing the amplitude of oscillation imparted to the driven member in order to effect parking of the wiper blades out of the normal range of vision and remote from the normal wiping range. In order to vary the amplitude of oscillation imparted to the driven member, the present invention contemplates means for varying the effective operating length of the connecting rod. In the instant disclosure the effective operating length of the connecting rod is varied by altering the angular relationship between the connecting rod and a line intersecting the axes of the driving and driven members. These means comprise a second link having a configuration similar to that of a bell crank. One end of the second link is pivotally connected at the point of pivotal connection between the operating link and the connecting rod, the other end of this link having a movable pivot point connection for varying the effective operating length of the connecting rod. The movable pivot point connection is carried by one end of a lever, which is pivotally mounted in a housing enclosing the motion converting mechanism, the lever being movable between predetermined limits. Means are provided for normally maintaining the lever and the movable pivot point connection for the bell crank shaped, or adjusting, link in a position wherein the amplitude of oscillation imparted to the driven member is the lesser of the oscillatory arcs. If the operator should desire to cease wiper operation, he need only move a motor controlling switch, not shown, to an off position which effects movement of an element so that upon swinging movement of the adjusting link, the movable pivot point therefor will be displaced and the amplitude of oscillation imparted to the driven member will be increased to its greater arc.

By displacing the movable pivot point of the adjusting link, automatic switch means are actuated for deenergizing the electric motor. In addition, a sequence of operations occurs which results in arresting rotation of the motor shaft momentarily after deenergization of the motor. The arresting means include a second lever, one end of which is pivotally connected to the movable pivot point connection of the adjusting link and the first mentioned lever. The two levers together constitute a form of toggle mechanism with the intermediate point of the second lever being spring biased so as to normally position the toggle in one of its two limit positions. The free end of the second lever is formed as a cam follower. The worm gear or driving member has formed thereon a cam surface with a sharp rise of small circumferential extent. The cam follower on the free end of the second lever is cyclically moved during rotation of the worm gear. This lever is employed to initiate self-energization of the brake means when the movable pivot point of the adjusting link is displaced so as to increase the effective operating length of the connecting rod. After initial brake energization, the brake becomes self-energizing and arrests rotation of the motor driven shaft momentarily after the electric motor is deenergized. When operation is resumed, a torsion spring arrangement deenergizes the brake in less than one revolution of the motor shaft, as the movable pivot point of the adjusting link is now in a position where the effective operating length of the connecting rod is at a minimum, in which instance cyclical actuation of the second lever will not initiate brake energization.

Further objects and advantages of the present invention will be apparent from the following description, reference being had to the accompanying drawings wherein preferred embodiments of the present invention are clearly shown, and wherein like numerals denote like parts throughout the several views.

In the drawings:

Fig. 3 is a fragmentary view with the brake means completely energized or applied.

Fig. 4 is a fragmentary view in elevation of the brake assembly with certain parts removed.

Fig. 5 is a view taken in the direction of arrow 5 in Fig. 4.

Fig. 6 is a view taken in the direction of arrow 6 in Fig. 4.

Fig. 7 is an enlarged fragmentary view taken along line 7—7 of Fig. 1.

Fig. 8 is a fragmentary view of the pivot point displacing element of the mechanical movement.

At the offset, it should be noted that while the brake means of the present invention is disclosed in conjunction with wiper actuating mechanism constructed similar to that disclosed in copending application, Serial No. 347,021, filed of even date herewith, in the names of John B. Dyer and Walter D. Harrison, the mechanism is capable of diverse application. Moreover, while the brake mechanism is shown in conjunction with a mechanical movement for converting rotary motion to oscillatory motion in a manner similar to that disclosed in copending application, Serial No. 347,022, filed of even date herewith, in the names of John B. Dyer and Walter D. Harrison, it will be readily apparent to those skilled in the art that the mechanism could be combined with various other mechanisms, or used independently.

Figure 1:
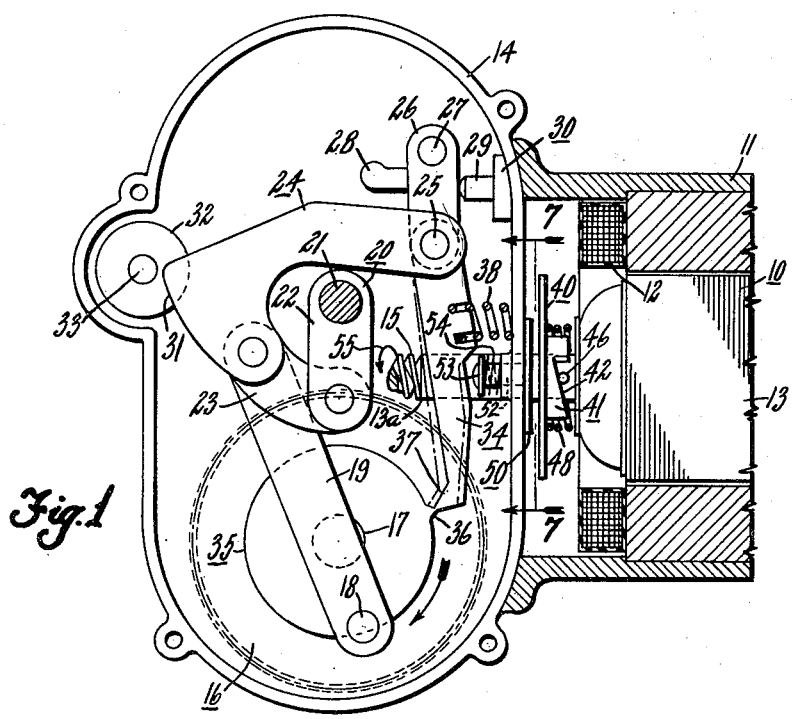
Fig. 1 is a view, partly in section and partly in elevation, of mechanism constructed according to this invention, with the brake means released.

As the application of brake mechanism constructed according to this invention may be employed in conjunction with electric windshield wiper actuating mechanism, typical wiper actuating mechanism will be briefly described. With particular reference to Fig. 1, an electric motor 10 disposed in a casing 11 and having conventional pole pieces and a field winding 12, is depicted as having an armature 13, the shaft 13a of which extends into a housing 14. The electric motor may be of the unidirectional D. C. type, and one end of the armature shaft is formed as a worm 15. The worm 15 drivingly engages a worm gear, or driving member, 16 rotatably supported by a shaft 17 within the housing 14. The worm gear 16 carries an eccentric bearing 18, which constitutes a crank pin. One end of a connecting rod 19 is pivotally connected to the bearing 18, the other end of this connecting rod extending adjacent a driven member 20, to which oscillation is imparted during rotation of the driving member 16. The driven member includes a rotatably supported shaft 21 having attached thereto, and extending therefrom, an arm 22. The adjacent ends of the arms 22 and the connecting rod 19 are interconnected by an operating link 23, which in this instance is of arcuate configuration.

Figure 2:
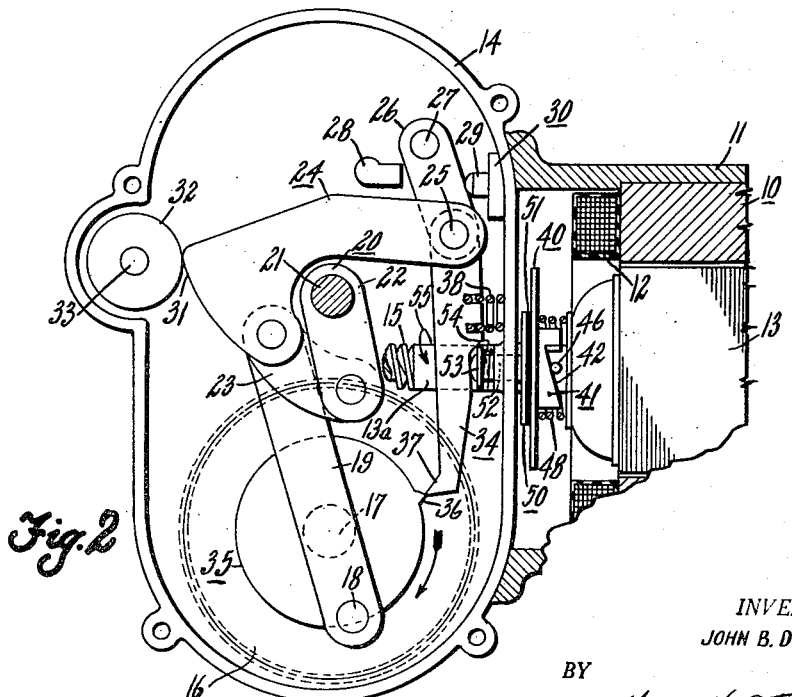
Fig. 2 is a view similar to Fig. 1, showing the brake means as energization thereof is initiated.

One end of a bell crank shaped adjusting link 24 is pivotally interconnected at the point of pivotal interconnection between the connecting rod 19 and the operating link 23. The other end of the adjusting link 24 has a movable pivot point 25, which is carried by one end of a first lever 26, the other end of which is pivotally mounted at 27 to the housing 14. Clockwise movement of the lever 26 about its pivot point 27, as viewed in Figs. 1 and 2, is limited by a stop 28 formed integral with the housing 14. Counterclockwise movement of the lever 26, as viewed in Figs. 1 and 2, is limited by the permissible depression of a spring biased plunger 29 forming part of an automatic switch 30. The adjusting link 24 has a cam surface 31 formed thereon, which under certain conditions engages the peripheral surface of an axially movable roller 32 supported by a shaft 33 within the housing 14. The aforegoing structure is described in greater detail in the aforementioned copending application, Serial No. 347,021.

As stated hereinbefore, the instant invention is primarily directed to means for arresting rotation of a rotating element, which, in this instance, partakes the form of the armature shaft 13a of the electric motor 10. This brake mechanism will now be described, in a manner so as to be divorced as much as is possible from the structure aforedescribed. One end of a second lever 34 is pivotally attached to the end of lever 26 by the movable pivot point 25 of the adjusting link 24. The worm gear 16 has formed thereon a cam surface 35, the major portion of which is concentric with the outer circumference of the gear but which is laterally displaced from the plane thereof. One portion of the cam surface 35 has a sharp rise 36 therein of rather small angular extent. The free end of the lever 34 is formed with a cooperable sharp rise 37, which functions as a cam follower.

An intermediate portion of the lever 34 is biased by means of a spring 38, one end of which seats on the lever and the other end of which is suitably attached to a portion of the housing 14. The two levers 26 and 34, and the spring 38, form a toggle mechanism, the limit positions of which are depicted by Figs. 1 and 2. Upon rotation of the driving member 16, the lever 34 will be cyclically actuated between the dotted and full line positions it is shown in Fig. 1, inasmuch as the spring 38 urges the cam follower portion 37 into engagement with the cam surface 35. Thus, during each revolution of the driving member 16, the cam rise 36 will effect cyclic pivotal movement of the lever 34 about its pivot 25.

The self-energizing brake means of this invention will next be described. The brake mechanism includes a first brake element 40 having an axially extending collar portion 41 of reduced diameter which encompasses the shaft 13a of armature 13. The brake member 40 is adapted for limited rotary and axial movement relative to the armature shaft. As it is seen particularly in Figs. 4 and 6, the collar portion 41 is formed with diametrically opposed inclined cam surfaces 42 and 43, which are separated by full length portions 44 and 45. The armature shaft 13a is cross bored and a cross pin 46 is retained within the cross bore adjacent the brake member 40. The armature shaft is also cross bored and has a cross pin 47 therethrough on the opposite side of brake member 40 and at an angle 90° displaced from cross pin 46. Cross pins 46 and 47 define the limit positions of axial movement of the brake member 40. A torsion spring 48 encompasses the collar 41, one end of the torsion spring being attached to the brake member 40 at 49 and the other end of the spring being hooked around one end of cross pin 46.

A second brake member 50, having a friction surface 51, is supported by the housing 14 for axial movement relative to the armature shaft. Brake member 50 is at all times restrained against rotation and is supported by a stub shaft 52 having a collar 53 at one end and a spring 54 between the collar 53 and a wall of housing 14 to normally maintain the brake member 50 in the position shown in Fig. 1. With the brake member in the position of Fig. 1, cyclical actuation of the lever 34 caused by the cam surface 35 during rotation of the gear 16 will not initiate energization of the brake. However, when the movable pivot point 25 of the adjusting link 24 is displaced by a swinging movement of the adjusting link and engagement between cam surface 31 and the roller 32, an intermediate portion of the lever 34 will engage the end of shaft or pin 52 when the cam follower 37 engages the rise 36 so that the brake member 50 with its friction surface 51 will be moved to the right, as viewed in Fig. 1, to the position shown in Fig. 2. Movement of the friction surface 51 into engagement with the brake member 40 will initiate self-energization of the brake mechanism in the following manner.

Momentary engagement between the friction surface 51 and the brake member 40 will tend to restrain rotation of the brake member 40, which is rotated through the torsion spring 48 in the direction of arrow 55 of Figs. 1 and 2. This momentary restraint on the rotation of member 40 will cause the cross pin 46 to ride up the inclined surfaces 42 and 43, thereby increasing the frictional resistance of the rotation of the armature shaft 13a. Thus, the brake mechanism may conveniently be termed self-energizing. However, continued rotation of the worm gear 16 will result in the lever 34 moving to the position shown in Fig. 3, thereby permitting the spring 54 to move the friction surface brake member 50 away from the brake member 40 to the position shown in Fig. 3. This movement of the brake member 50 away from the brake member 40 does not adversely effect the application of the brake to the armature shaft 13a inasmuch as during rotation of the armature shaft, the cross pins are riding up the inclined surfaces 42 and 43 of the collar 41 and applying increased pressure between the two brake members. Moreover, inasmuch as the motor has been deenergized concurrently with the movement of brake member 50 into engagement with brake member 40, the armature shaft does not have sufficient inertia to effect substantial rotation thereof after the brake mechanism is applied.

*Operation*

In the operation of the mechanism to be described, it is to be understood that the energizing circuit for the electric motor 10 includes a manual switch and the automatic switch means 30, which shunts the automatic switch and permits deenergization of the motor only when the gear 16 is in a predetermined position, as is more fully disclosed in the aforementioned copending application, Serial No. 347,021. Suffice it here to say that when the manual switch, not shown, is closed, the roller 32 is moved to a dotted line position of Fig. 8. Thus, the movable pivot point 25 of the adjustable link 24 is in the position shown in Fig. 1, and upon rotation of the armature shaft 13a and the worm gear 16, oscillation of predetermined magnitude will be imparted to the driven member 20. As hereinbefore mentioned, rotation of the worm gear 16 will effect cyclical actuation of the lever 34 between the full and dotted line positions of Fig. 1. However, inasmuch as the movable pivot point 25 of the adjusting link 24 is in the position of Fig. 1, the lever 34 will not contact the end of pin 52 due to the cam follower riding on the surface of cam 35 and initiation of brake energization will not occur.

If the operator should desire to interrupt operation of the shaft 21 and stop it in the predetermined position, he need only open the manual switch, not shown, which effects movement of the roller 32 to its full line position, as shown in Fig. 8. With the roller 32 in its full line position of Fig. 8, swinging movement of the adjusting link 24 by the connecting rod 19 will result in physical engagement between the surface of roller 32 and the cam surface 31. This, in turn, will displace the movable pivot point 25 of the adjusting link 24 so as to increase the effective operating length of the connecting rod 19 and concurrently therewith open the automatic switch means 30 so as to deenergize the motor 10. The effective operating length of the connecting rod 19 is increased by varying the angular relationship between the connecting rod and a line intersecting the axes of shafts 17 and 21.

Concomitantly with the displacing of pivot point 25, the toggle mechanism formed by links 26 and 34 is moved to the position of Fig. 2, the position of the cam rise 36 being such that the cam follower 37 will move up the rise 36 substantially concurrently with the displacement of pivot point 25, the opening of automatic switch means 30, and the movement of the toggle mechanism to the position of Fig. 2, such that an intermediate portion of the lever 34 will engage pin 52 and move the surface brake member 50 into momentary engagement with the brake member 40. Since the motor 10 has been deenergized by the opening of the switch means 30, rotation of the armature by inertia, or coasting, will cause the cross pin 46 to ride up the incline of the cam surfaces 42 and 43, whereupon the brake is self-energized and is capable of restraining rotation of the armature shaft 13a in less than one revolution. Continued rotation of the armature shaft before it is brought to a standstill rotates gear 16 so that cam follower 37 of lever 34 moves to the position of Fig. 3 whereupon the spring 54 will move the brake member 50 to the position of Fig. 3.

If the operator should now desire to initiate operation of the motor 10, he merely closes the manual switch, not shown, which effects concurrent axial movement of the roller 32 so as to displace the movable pivot point from the position of Fig. 2 to the position of Fig. 1 under the urge of spring 38. Rotation of the armature shaft 13a in the direction of arrow 55 will drive the brake member 40 through the torsion spring 48 so as to release the brake means and reposition the cross pin 46 on the lower portion of the inclined surfaces 42 and 43 and, thus, fully release the brake.

From the foregoing it is apparent that the present invention provides unique self-energizing brake means for arresting rotation of a rotating element at a predetermined point substantially instantaneously. Moreover, the mechanism is extremely simple in nature and performs its functions satisfactorily.

While the embodiments of the present invention as herein disclosed, constitute preferred forms, it is to be understood that other forms might be adopted.

What is claimed is as follows:

1. Means for arresting a rotating element including, a first brake member restrained against rotation but adapted for limited translation, a second brake member operatively connected to said rotating element but adapted for limited rotation and translatory movement relative thereto, means to effect translatory movement of said first brake member into frictional engagement with said second brake member so as to momentarily restrain rotation of said second brake member, and means actuated by momentary restraint of said second brake member for effecting translatory movement of said second brake member toward said first brake member so as to arrest rotation of said element.

2. Means for arresting rotation of a shaft including a first brake member having a friction surface and restrained against rotation but adapted for limited axial movement relative to said shaft, a second brake member operatively connected to said shaft but adapted for limited rotary and axial movement relative thereto, means operatively associated with said first brake member to effect axial movement of said member into frictional engagement with said second brake member, and means actuated by movement of said first brake member into frictional engagement with said second brake member for effecting axial movement of said second brake member into engagement with the frictional surface of the first brake member so as to arrest the rotation of said shaft.

3. The combination set forth in claim 2 wherein said second brake member comprises a disc having a collar which encompasses and is operatively connected to said shaft.

4. The combination set forth in claim 2 wherein the operative connection between said second brake member and said shaft is constituted by a torsion spring, one end of said spring being attached to said second brake member and the other end of said spring being attached to said shaft.

5. The combination set forth in claim 2 wherein said shaft carries a cross pin, and wherein said second brake member includes a collar encompassing said shaft and having an inclined cam surface such that relative rotation between said second brake member and shaft effects axial movement of said second brake member.

6. Means for arresting movement of an oscillatable driven member at a predetermined position, said member being driven by a rotating shaft and means interconnecting said shaft and said member adapted to impart oscillation to said member upon rotation of said shaft, including in combination, a pair of brake members, one of said members being restrained against rotation but adapted for limited translation and the other of said members being operatively connected to said rotating shaft, and means to cause translatory movement of said one brake member to effect engagement between said brake members controlled by the position of said oscillatable driven member so as to arrest rotation of said shaft and oscillation of said member at a predetermined position.

7. In combination with a mechanical movement including, a rotatable driving member, an oscillatable driven member, means interconnecting said members constructed and arranged to impart oscillatory movement to said driven member upon rotation of said driving member, and means operatively associated with and actuated by said first recited means for varying the amplitude of oscillatory movement imparted to said driven member; a rotatable shaft for driving said rotatable driving member, a first brake member restrained against rotation but capable of axial movement relative to said shaft, a second brake member operatively connected to said shaft but capable of relative rotary and axial movement relative thereto, means actuated by operation of the amplitude varying means for effecting axial movement of said first brake member into frictional engagement with said second brake member, and means actuated by movement of said first brake member into frictional engagement with said second brake member to effect axial movement of said second brake member relative to said shaft to thereby arrest rotation of said shaft and bring said oscillatable driven member to rest at a predetermined position.

8. The combination set forth in claim 7 wherein the amplitude varying means includes a link having a movable pivot point, a lever for carrying the movable pivot point, a second lever having pivotal connection with said first lever at said movable pivot point and having an end operatively associated with said driving member so as to be cyclically moved during rotation of said driving member.

9. The combination set forth in claim 8 wherein the means for effecting axial movement of said first brake member include a pin constructed and arranged to engage said second lever when the pivot point of said link is displaced so as to increase the amplitude of oscillatory movement imparted to said oscillatable driven shaft.

10. The combination set forth in claim 8 wherein said driving member has a cam surface formed thereon with a single rise, said second lever constituting a cam follower, and resilient means maintaining said cam follower in engagement with said cam surface.

11. Means for bringing a rotating shaft to rest comprising, a first brake member restrained against rotation but adapted for limited axial movement relative to said shaft, a second brake member operatively connected to said shaft but adapted for limited rotary and axial movement relative thereto, means operable to effect axial movement of said first brake member into engagement with the second brake member so as to cause said shaft to lead the movement of said second brake member, and cam means responsive to the relative displacement of the second brake member and the shaft for effecting axial movement of said second brake member into engagement with said first brake member so as to increase the braking force and bring said shaft to rest.

12. In a braking device, a rotatable shaft, a first brake member restrained against rotation but adapted for limited axial movement relative to said shaft, a second brake member normally rotatable with said shaft and movable axially relative thereto, a torsion spring driving connection between said shaft and said second brake member, said connection permitting relative angular movement between said second brake member and said shaft, means operable to effect axial movement of said first brake member into engagement with the second brake member to cause relative angular movement between the second brake member and said shaft, and means responsive to relative angular movement between the second brake member and said shaft for effecting axial movement of the second brake member into engagement with the first brake member so as to increase the braking force and bring the shaft to rest.

13. In a braking device, a rotatable shaft, a first brake member restrained against rotation but adapted for limited axial movement relative to said shaft, a second brake member normally rotatable with said shaft and movable axially relative thereto, a torsion spring driving connection between said shaft and said second brake member, said connection permitting relative angular movement between said second brake member and said shaft, means operable to effect axial movement of said first brake member into engagement with the second brake member to cause relative angular movement between the second brake member and said shaft, a cam surface on said second brake member and an element rigidly attached to said shaft and arranged to cooperate with said cam surface whereby upon relative angular movement between the second brake member and said shaft, which causes relative angular movement between said cam surface and said element, the second brake member will be moved axially into engagement with the first brake member so as to increase the braking force and bring said shaft to rest.

14. In a braking device, rotatable shaft, a first brake member restrained against rotation but adapted for limited axial movement relative to said shaft, a second brake member normally rotatable with said shaft and movable axially relative thereto, a torsion spring driving connection between said shaft and said second brake member, said connection permitting relative angular movement between said second brake member and said shaft, and means actuated upon relative angular movement between said shaft and said second member for effecting axial movement of said second brake member into engagement with said first brake member so as to bring said shaft to rest.

15. In combination, a rotatable driving member, an oscillatable driven member, means interconnecting said members for imparting oscillation to said driven member upon rotation of said driving member, a rotatable shaft for imparting rotation to said driving member, brake means for arresting rotation of said shaft, a toggle mechanism operatively connected with said driving member including a link which is cyclically actuated during rotation of said driving member, and means for actuating said toggle mechanism so that said link energizes said brake means at a predetermined position of said rotatable driving member to thereby arrest rotation of said shaft and bring said oscillatable driven member to rest at a predetermined position.

16. In combination, a rotatable driving member, an oscillatable driven member, means interconnecting said members for imparting oscillation to said driven member upon rotation of said driving member, means operatively connected with said interconnecting means for varying the amplitude of oscillatory movement imparted to said driven member upon rotation of said driving member, a rotatable shaft for imparting rotation to said driving member, brake means for arresting rotation of said shaft, and means actuated by operation of said amplitude varying means for energizing said brake means to thereby arrest rotation of said shaft and bring said oscillatable member to rest at a predetermined position.

References Cited in the file of this patent
UNITED STATES PATENTS

| 354,399 | Desdouits | Dec. 14, 1886 |
| 1,529,788 | Himes | Mar. 17, 1925 |
| 2,175,897 | Johnson | Oct. 10, 1939 |
| 2,271,359 | Zeruneith | Jan. 27, 1942 |

FOREIGN PATENTS

| 300,729 | Great Britain | Nov. 22, 1928 |